United States Patent
Sano

(10) Patent No.: US 10,907,535 B2
(45) Date of Patent: Feb. 2, 2021

(54) TURBINE HOUSING OF TURBOCHARGER

(71) Applicant: HONDA MOTOR CO., LTD., Tokyo (JP)

(72) Inventor: Toshikazu Sano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/576,174

(22) Filed: Sep. 19, 2019

(65) Prior Publication Data

US 2020/0116079 A1    Apr. 16, 2020

(30) Foreign Application Priority Data

Oct. 10, 2018 (JP) .................... 2018-191944

(51) Int. Cl.
*F02B 37/18* (2006.01)
*F02C 6/12* (2006.01)

(52) U.S. Cl.
CPC .............. *F02B 37/183* (2013.01); *F02C 6/12* (2013.01); *F05D 2220/40* (2013.01)

(58) Field of Classification Search
CPC ...... F02B 37/18; F02B 37/183; F02B 37/186; F02C 6/12; F05D 2220/40; F01D 17/10; F01D 17/105; F01D 17/146; Y02T 10/144
See application file for complete search history.

(56) References Cited

U.S. PATENT DOCUMENTS

2014/0174077 A1 * 6/2014 Palaniyappan ....... F02B 37/183
60/602

FOREIGN PATENT DOCUMENTS

JP        S6011631 A     1/1985
JP        2016011655 A   1/2016

* cited by examiner

*Primary Examiner* — Jesse S Bogue
*Assistant Examiner* — Loren C Edwards
(74) *Attorney, Agent, or Firm* — Armstrong Teasdale LLP

(57) ABSTRACT

In a turbine housing (2) of a turbocharger (1) including a turbine housing portion (7) defining a turbine chamber, an exhaust inlet passage portion 9 (9) defining an exhaust inlet passage, and a valve housing portion (12) defining a wastegate outlet passage (11) communicating with the turbine chamber via a turbine outlet passage (14) and with the exhaust inlet passage via a bypass passage (16), a wastegate valve (10) is pivotally supported by the valve housing portion to cooperate with a wastegate valve seat (34) provided at a downstream end of the bypass passage. A valve peripheral wall portion (33) of the valve housing portion includes a curved wall portion (32), and a part of the curved wall portion adjacent to the wastegate valve seat is formed with a thick wall portion (35) having a locally increased thickness.

17 Claims, 10 Drawing Sheets

TURBINE HOUSING OF TURBOCHARGER

TECHNICAL FIELD

The present invention relates to a turbine housing of a turbocharger.

BACKGROUND ART

The turbocharger is known as a device for increasing the output of an internal combustion engine by compressing the intake of the engine by making use of the energy of the engine exhaust gas. The housing of the turbocharger typically consists of a turbine housing, a compressor housing and a center housing or a bearing housing that integrally joins the compressor housing and the turbine housing to each other. A bearing shaft extends through the center housing, and connects a turbine wheel received in a turbine chamber defined in the turbine housing to a compressor wheel received in a compressor chamber defined in the compressor housing. The rotational power of the turbine wheel generated by the flow of the exhaust gas is transmitted, via the bearing shaft, to the compressor wheel which compresses the intake of the engine.

The turbocharger is typically provided with a bypass passage communicating an exhaust inlet passage of the turbine to an exhaust outlet passage, and a wastegate valve that variably controls the degree of communication of the bypass passage for the purpose of adjusting the supercharging of the engine. See JP2016-011655A, for instance. The wastegate valve is actuated by an actuator typically attached to the compressor housing which is comparatively lower in temperature than the turbine housing during the operation. The turbine housing typically consists of a single piece cast member internally defining the turbine chamber, the exhaust inlet passage and the exhaust outlet passage The turbine housing rises in temperature during the operation due to the heat from the exhaust gas that flows inside the turbine housing. Therefore, cracks could be generated in the parts of the turbine housing which are subjected to thermal fatigue and thermal impact. To overcome this problem, it has been proposed to form the turbine housing by using austenitic nodular carbon cast iron having a high nickel content. See JPS60-11631A. It has also been proposed to increase the wall thickness of the parts that rise in temperature during the operation.

However, increasing the nickel content causes an increase in the material cost, and increasing the wall thickness of the turbine housing increases the material cost and the weight of the turbine housing without significantly improving the resistance to cracking.

SUMMARY OF THE INVENTION

In view of such a problem of the prior art, a primary object of the present invention is to provide a turbine housing of a turbocharger that can effectively prevent the generation and propagation of cracks without increasing the material cost and/or the weight.

To achieve such an object, one embodiment of the present invention provides a turbine housing (2) of a turbocharger (1), comprising: a turbine housing portion (7) defining a turbine chamber receiving a turbine wheel (5) therein, and a turbine outlet passage (14) extending in an axial direction from the turbine chamber (6); an exhaust inlet passage portion 9 (9) defining an exhaust inlet passage (8) communicating with the turbine chamber (6) in a tangential direction; and a valve housing portion (12) defining a wastegate outlet passage (11) communicating with the turbine chamber via the turbine outlet passage, and housing a wastegate valve (10) that selectively closes a bypass passage (16) communicating the exhaust inlet passage with the wastegate outlet passage; wherein the turbine housing portion is provided with an end wall (31) separating the wastegate outlet passage from the turbine chamber and the exhaust inlet passage, and provided with openings defining the turbine outlet passage and the bypass passage, a side of the end wall facing the wastegate outlet passage being provided with a wastegate valve seat formed as an annular boss projecting into the wastegate outlet passage and surrounding a downstream end of the bypass passage, wherein the valve housing portion is provided with a valve peripheral wall portion (33) extending axially from a peripheral part of the end wall so as to define an outer periphery of the wastegate outlet passage, the valve peripheral wall portion including a curved wall portion (32) provided in an upstream part thereof and an outlet flange (15) extending radially outward from a downstream end of the valve peripheral wall portion, and wherein a part of the curved wall portion adjacent to the wastegate valve seat is formed with a thick wall portion (35) having a locally increased thickness.

The part of the curved wall portion adjacent to the wastegate valve seat is prone to stress concentration, and cracks are likely to be generated and propagated in this region. Owing to the presence of the thick wall portion in this region, generation and propagation of cracks in this region can be avoided. In particular, by making the change in wall thickness from the part adjoining to the wastegate valve seat to the downstream end of the valve peripheral wall portion smooth and gradual, generation and propagation of cracks in this region can be particularly effectively avoided. Thereby, the durability of the turbine housing can be improved by using relatively inexpensive material for the turbine housing. Also, the wall thickness of the remaining part of the valve peripheral wall portion can be reduced as compared to the conventional turbine housing so that the material cost and the weight of the turbine housing can be minimized.

Preferably, the turbine outlet passage and the bypass passage are spaced away from each other in a prescribed direction, and the thick wall portion is positioned in a part of the curved wall portion on a side of the wastegate valve seat facing away from the turbine outlet passage.

Since the thick wall portion is provided in a part of the curved wall portion which is relatively low in temperature on the outside and relatively high in temperature on the inside, and is hence under a relatively severe thermal condition, the presence of the thick wall portion in this part is effective in preventing the generation and propagation of cracks in this part.

Preferably, the valve housing portion includes a part extended beyond the exhaust inlet passage portion in an axial view, and the thick wall portion is provided in the part of the valve housing portion extended beyond the exhaust inlet passage portion.

The part of the valve housing portion extended beyond the exhaust inlet passage portion is subjected to a relatively high temperature on the inner side thereof, while the outer side thereof is exposed to and cooled by the ambient air, and therefore, this part tends to be subjected to thermal stress. Therefore, the presence of the thick wall portion in this part is effective in preventing the generation and propagation of cracks in this part. Typically, the extended part of the valve housing portion overhangs radially outward with respect to an outer profile of the exhaust inlet passage portion. In such a case, the extended part of the valve housing portion is particularly exposed to the ambient air, and the provision of the thick wall portion in this part is particularly effective in suppressing thermal stress.

Preferably, the turbine housing further comprises a first hypothetical line (L1) extending in a flow direction of exhaust gas in the exhaust inlet passage at a center of an outlet of the bypass passage, and a second hypothetical line (L2) orthogonally crossing the first hypothetical line at the center of the outlet of the bypass passage, in axial view, wherein the thick wall portion is provided in a part of the curved wall portion on a side of the first hypothetical line opposite to the turbine outlet passage and on a downstream side of the second hypothetical line with respect to the flow direction of the exhaust gas in the exhaust inlet passage.

Thus, the thick wall portion is provided in the part of the curved wall portion which is particularly cooled from the outside and heated from the inside, and is hence most susceptible to thermal stress. Therefore, the turbine housing can be protected from thermal stress in a favorable manner.

Preferably, the thick wall portion has a wall thickness that progressively decreases from the wastegate valve seat to the outlet flange.

Thereby, the transition of the wall thickness from the part of the end wall adjacent to the wastegate valve seat to the part of the valve peripheral wall portion adjacent to the outlet flange can be made adequately gradual and continuous so that the generation and propagation of cracks in this region can be effectively prevented.

Preferably, an inner surface of the thick wall portion has a greater radius of curvature (Ri) than an outer surface of the thick wall portion in a section passing through the bypass passage and the turbine outlet passage (Ri>Ro).

Thereby, the thick wall portion can be formed without outwardly expanding the outer surface of the curved wall portion so that the increase in the size and the weight of the turbine housing can be avoided.

Preferably, an inner surface of the thick wall portion has an upstream portion (36) adjacent to the end wall and having a first radius of curvature (r1), and a downstream portion (37) smoothly connected to a downstream end of the upstream portion, and having a second radius of curvature (r2) which is five or more times greater than the first radius of curvature and a length which is five or more times greater than the upstream portion, in a section passing through the bypass passage and the turbine outlet passage.

Thereby, the increase in the size and the weight of the turbine housing can be avoided owing to the absence of the bulging of the outer surface of the curved wall portion, and stress concentration in the thick wall portion can be avoided.

Preferably, an inner surface of the thick wall portion is smoothly connected to an annular curved surface (34c) which smoothly connects an outer surface of the end wall with an outer circumferential surface of the wastegate valve seat.

Thereby, the increase in the size and the weight of the turbine housing can be avoided owing to the absence of the bulging of the outer surface of the curved wall portion, and stress concentration in the thick wall portion can be avoided.

Preferably, a groove (38) extending in a tangential direction with respect to the bypass passage is formed in a part of the end wall located between an annular curved surface of the wastegate valve seat and an inner surface of the thick wall portion.

Thereby, the increase in the size and the weight of the turbine housing can be avoided owing to the absence of the bulging of the outer surface of the curved wall portion, and stress concentration in the thick wall portion can be avoided.

Preferably, the groove is curved along a circumferential direction of the wastegate valve seat.

Thereby, the groove becomes particularly effective in preventing the generation and the propagation of cracks.

Preferably, the groove extends between the annular curved surface of the wastegate valve seat and the inner surface of the thick wall portion.

Thereby, the groove becomes particularly effective in preventing the generation and the propagation of cracks.

Preferably, the wastegate valve is provided with a valve shaft (25) having an axial line substantially in parallel with the second hypothetical line, and located on an upstream side of the wastegate valve seat with respect to the flow direction of the exhaust gas in the exhaust inlet passage.

The wastegate valve opens the bypass passage by rotating away from the wastegate valve seat around the valve shaft. Therefore, the exhaust gas exiting the bypass passage is deflected by the wastegate valve, and is directed away from the valve shaft. Therefore, the part of the curved wall portion opposing the wastegate valve seat is particularly exposed to the heat of the exhaust gas. Therefore, the presence of the thick wall portion in this part is effective in preventing the generation and propagation of cracks in this part.

The present invention thus provides a turbine housing of a turbocharger that can effectively prevent the generation and propagation of cracks without increasing the material cost and/or the weight.

BRIEF DESCRIPTION OF THE DRAWING(S)

DESCRIPTION OF THE PREFERRED EMBODIMENT(S)

A preferred embodiment of the present invention is described in the following with reference to the appended drawings.

Figure 1:
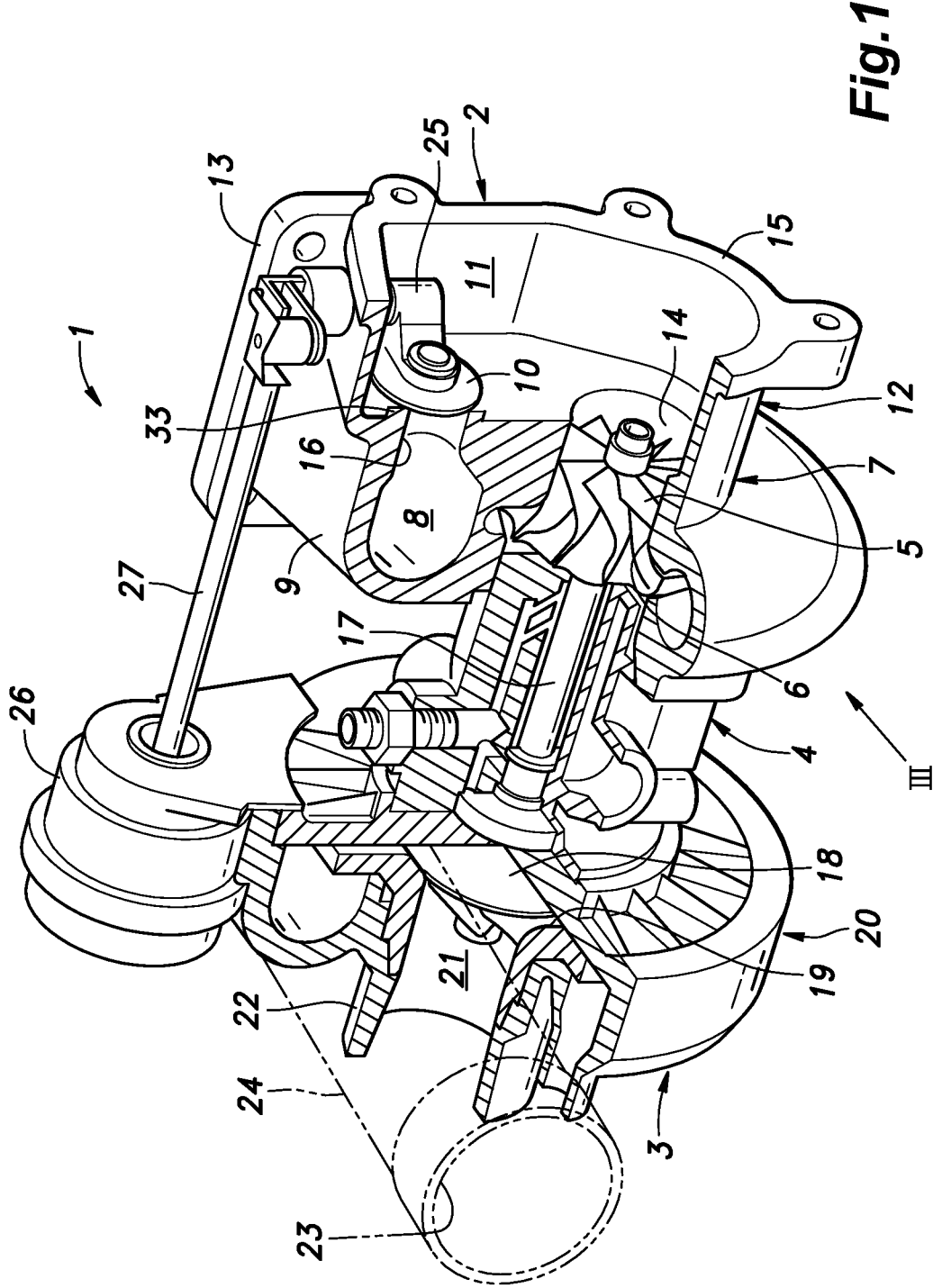
FIG. 1 is a perspective view of a turbocharger according to an embodiment of the present invention partly in section.

FIG. 1 is a perspective view of a turbocharger 1 according to an embodiment of the present invention partly in section. As shown in FIG. 1, the turbocharger 1 includes a turbine housing 2, a compressor housing 3, and a center housing 4 (bearing housing) that joins the turbine housing 2 to the compressor housing 3. The turbine housing 2 includes a turbine housing portion 7 that defines a turbine chamber 6 that accommodates a turbine wheel 5, an exhaust inlet passage portion 9 that defines an exhaust inlet passage 8 that communicates with the turbine chamber 6 in a tangential direction, and a valve housing portion 12 that defines a wastegate outlet passage 11 (which also serves as an exhaust outlet passage). The wastegate outlet passage 11 communicates with the exhaust inlet passage 8 via a wastegate valve 10.

The turbine housing portion 7 receives a turbine wheel 5 in a rotatable manner so as to be rotationally driven by the flow of the gas (exhaust gas) discharged from the engine. The upstream end of the exhaust inlet passage portion 9 is integrally formed with an inlet flange 13 that 5 is fastened to the exhaust manifold of the engine (not shown in the drawings). The downstream part of the exhaust inlet passage portion 9 has a spiral shape extending around the turbine chamber 6 so as to communicate with the exhaust inlet passage 8 in the tangential direction.

The turbine housing portion 7 receives a turbine wheel 5 in a rotatable manner so as to be rotationally driven by the flow of the gas (exhaust gas) discharged from the engine. The upstream end of the exhaust inlet passage portion 9 9 is integrally formed with an inlet flange 13 that is fastened to the exhaust manifold of the engine (not shown in the drawings). The downstream part of the exhaust inlet passage portion 9 9 has a spiral shape extending around the turbine chamber 6 so as to communicate with the exhaust inlet passage 8 in the tangential direction.

The wastegate outlet passage 11 communicates with the turbine chamber 6 via a turbine outlet passage 14 extending from the turbine chamber 6 in the axial direction. The valve housing portion 12 has a substantially cylindrical shape that opens in the axial direction of the turbine chamber 6, and the downstream end of the valve housing portion 12 is integrally formed with an outlet flange 15 for connecting an exhaust system such as an exhaust pipe or an exhaust catalyst thereto. The wastegate valve 10 is configured to selectively open and close a bypass passage 16 that communicates the exhaust inlet passage 8 with the wastegate outlet passage 11. The wastegate valve 10 is provided in the part of the wastegate outlet passage 11 located at the downstream end of the bypass passage 16. Thus, the wastegate outlet passage 11 functions a chamber for merging the turbine outlet passage 14 with the bypass passage 16, and a valve chamber for housing the wastegate valve 10 therein.

As shown in FIG. 1, the turbine wheel 5 is connected to the compressor wheel 18 via a bearing shaft 17 which is rotatably supported by the center housing 4 so that the rotational torque applied to the turbine wheel 5 by the exhaust gas is transmitted to the compressor wheel 18. The compressor housing 3 consists of a metallic cast member, and includes a compressor housing portion 20 that defines a compressor chamber 19 that accommodates the compressor wheel 18, an intake air introduction pipe portion 22 that defines an intake air introduction passage 21 communicating with the compressor chamber 19 in the axial direction, and an intake outlet pipe portion 24 that defines an intake outlet passage 23 communicating with the compressor chamber 19 in the tangential direction. As the compressor wheel 18 rotates, the intake air introduced from the intake air introduction passage 21 of the compressor housing 3 is compressed, and the compressed air is supplied from the intake outlet passage 23 to the engine.

The wastegate valve 10 adjusts the flow rate of the exhaust gas supplied from the exhaust inlet passage 8 to the turbine chamber 6 so that a desired level of supercharging may be accomplished by adjusting the rotational speed of the turbine wheel 5. More specifically, the wastegate valve 10 adjusts the opening degree of the bypass passage 16 to adjust the flow rate of the exhaust gas that bypasses the turbine chamber 6 from the exhaust inlet passage 8 to the wastegate outlet passage 11.

The wastegate valve 10 is fixedly supported by a valve shaft 25 which is in turn rotatably supported by the valve housing portion 12 (the turbine housing 2), and the valve shaft 25 is selectively driven by an actuator 26 so that the wastegate valve 10 can be rotated between a closed position for closing the bypass passage 16 and an open position for opening the bypass passage 16. The actuator 26 is attached to a part of the compressor housing 3 in order to avoid the heat from the turbine housing 2 that rises in temperature during operation. The output of the actuator 26 is transmitted to the valve shaft 25 via a drive rod 27 extending substantially in parallel with the bearing shaft 17 (the axial line of the turbocharger 1) and a bell crank mechanism provided on the valve shaft 25.

Figure 2:
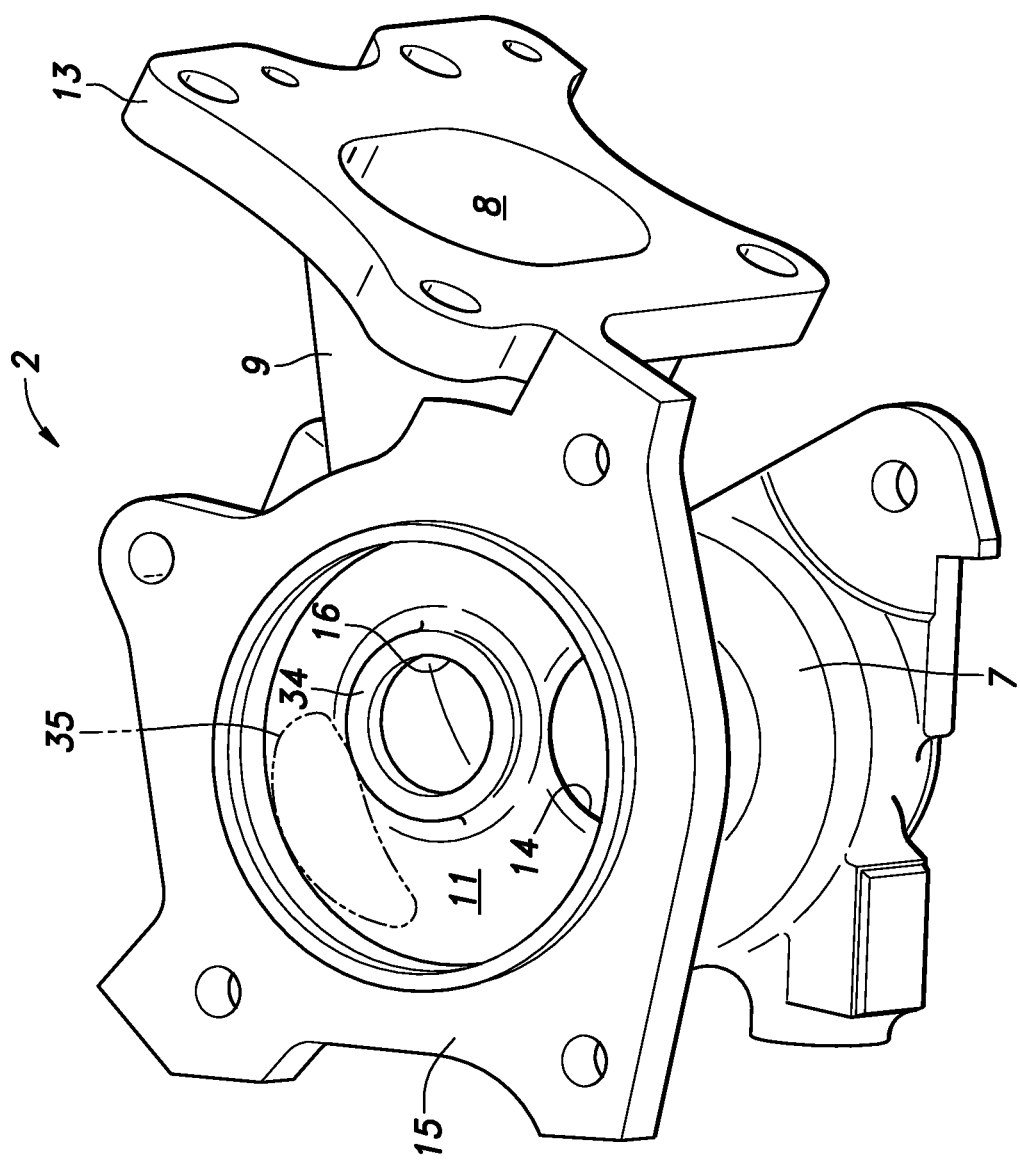
FIG. 2 is a perspective view of the turbine housing of the turbocharger as viewed from the exhaust outlet side.
Figure 3:
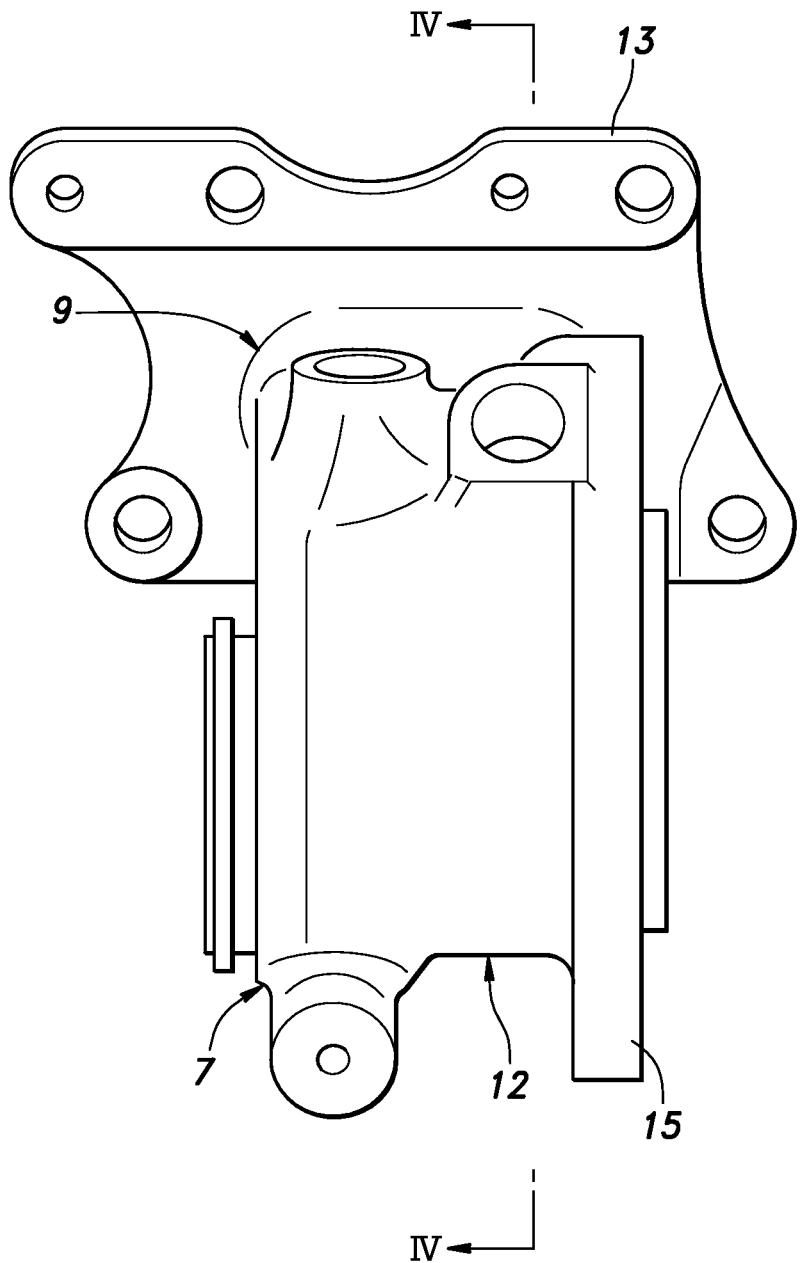
FIG. 3 is a front view of the turbine housing as viewed from direction III in FIG. 1.
Figure 4:
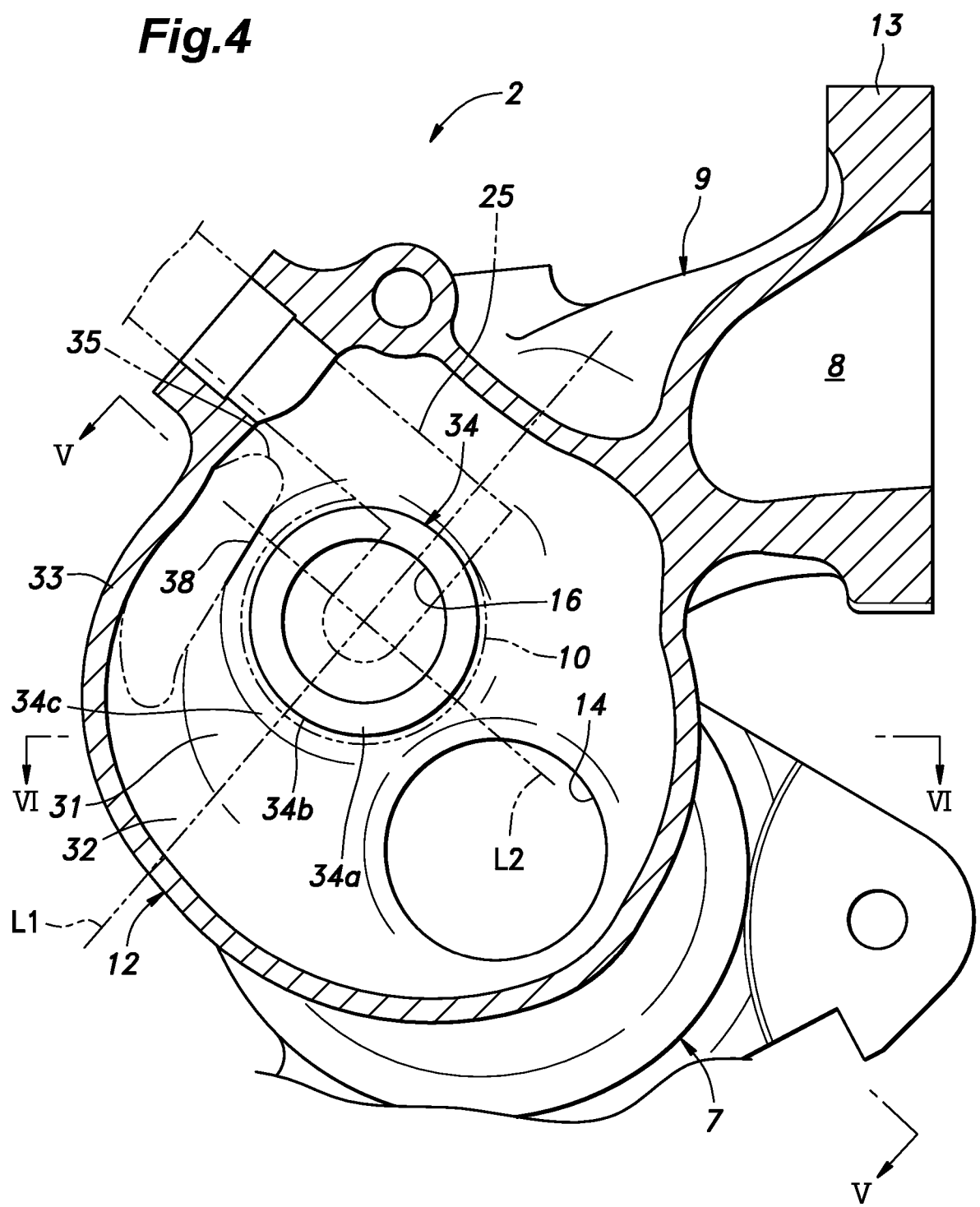
FIG. 4 is a sectional view taken along line IV-IV in FIG. 3.
Figure 5:
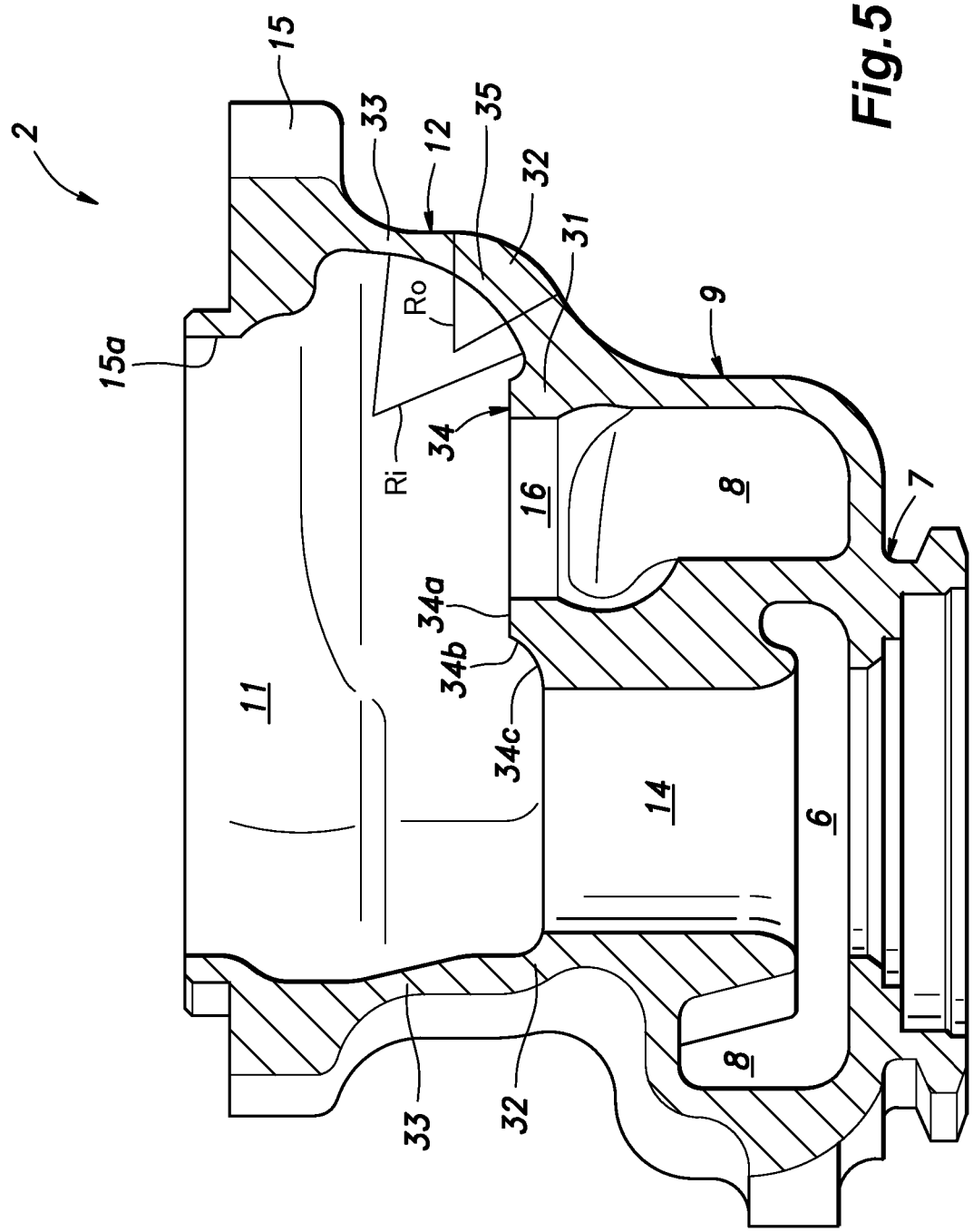
FIG. 5 is a sectional view taken along line V-V in FIG. 4.
Figure 6:
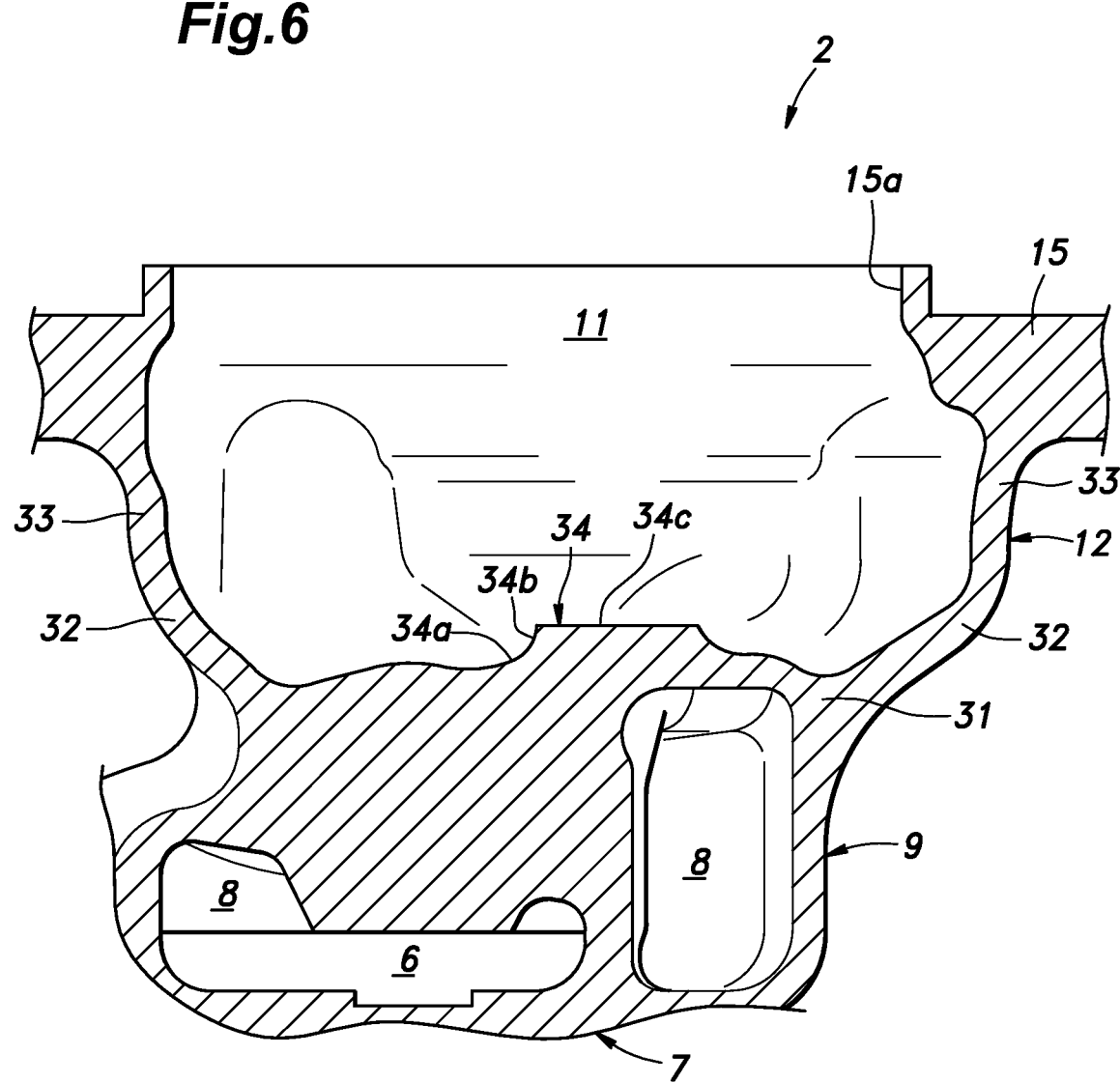
FIG. 6 is a sectional view taken along line VI-VI in FIG. 4.

FIG. 2 is a perspective view of the turbine housing 2 of the turbocharger 1 as viewed from the exhaust outlet side, and FIG. 3 is a front view of the turbine housing 2 as viewed from direction III in FIG. 1. FIG. 4 is a sectional view taken along line IV-IV in FIG. 3, FIG. 5 is a sectional view taken along line V-V in FIG. 4, and FIG. 6 is a sectional view taken along line VI-VI in FIG. 4. As shown in FIGS. 2 to 6, the valve housing portion 12 has a cylindrical shape having a substantially circular cross section, and an end wall 31 separates the wastegate outlet passage 11 from the turbine chamber 6.

As shown in FIGS. 4 to 6, the turbine outlet passage 14 and the bypass passage 16 are formed as openings in the end wall 31. The turbine outlet passage 14 and the bypass passage 16 are each formed as a circular opening in the end wall 31, and the bypass passage 16 is somewhat smaller in diameter than the turbine outlet passage 14.

The valve housing portion 12 is provided with a valve peripheral wall portion 33 that extends from the outer peripheral edge of the end wall 31 generally in the axial direction. The valve peripheral wall portion 33 defines the outer periphery of the wastegate outlet passage 11. The outlet flange 15 extends radially outward from the downstream end of the valve peripheral wall portion 33. As shown in FIG. 5, the inner surface of the valve peripheral wall portion 33 is provided with a curved wall portion 32 which generally concave in a sectional view taken along a plane parallel to the axial line of the turbine housing 2. In other words, the curved wall portion 32 diverges from the upstream end thereof (the part adjacent to the end wall 31) to the intermediate part thereof, and then converges from the intermediate part thereof to the downstream end thereof (the part adjacent to the outlet flange 15), generally in a smooth manner. Thus, the wastegate outlet passage 11 is provided with a generally barrel shape in such a manner that the cross sectional area thereof is greater in the intermediate part thereof than in the upstream end thereof and the downstream end thereof.

The end wall 31 is integrally provided with a wastegate valve seat 34 consisting of an annular boss surrounding the downstream opening of the bypass passage 16, and projecting from the outer surface of the end wall 31 into the wastegate outlet passage 11. The wastegate valve seat 34 defines an annular and flat seat surface 34a so as to form a tight seal in cooperation with the wastegate valve 10. The wastegate valve seat 34 has a substantially cylindrical outer peripheral surface 34b in the free end part thereof, and an annular curved surface 34c that smoothly connects the outer peripheral surface 34b with the outer surface of the end wall 31 in the base end part thereof.

When viewed from the axial direction (FIG. 4), the turbine outlet passage 14 and the bypass passage 16 are offset in different directions with respect to the center of the end wall 31. More specifically, the bypass passage 16 is offset toward the junction between the exhaust inlet passage 8 and the turbine chamber 6, and the wastegate outlet passage 11 is offset away from the junction. It should be noted that the wastegate outlet passage 11 is extended radially outward or bulges out from the axial center of the turbine chamber 6 toward the junction between the exhaust inlet passage 8 and the turbine chamber 6 as shown in FIG. 4.

In particular the curved wall portion 32 is extended beyond the exhaust inlet passage portion 9 in an axial view, and the thick wall portion 35 is provided in a part of the curved wall portion 32 extended beyond the exhaust inlet passage portion 9. Thus, the extended part of the curved wall portion 32 overhangs radially outward with respect to an outer profile of the exhaust inlet passage portion 9.

As shown in FIG. 4, the valve shaft 25 of the wastegate valve 10 is disposed, with respect to the bypass passage 16, on the side of the inlet flange 13 or on the upstream side of the exhaust inlet passage 8. Therefore, when the wastegate valve 10 is driven around the axis of the valve shaft 25 to open the bypass passage 16, the exhaust gas flowing from the exhaust inlet passage 8 through the bypass passage 16 is deflected and directed substantially in the same direction as the exhaust gas flowing through the exhaust inlet passage 8.

As shown in FIGS. 4 and 5, the part of the valve peripheral wall portion 33 opposing or adjacent to the wastegate valve seat 34 is a part of the curved wall portion 32 which is relatively more recessed outward than the surrounding part of the valve peripheral wall portion 33. A part of the curved wall portion 32 adjacent to the wastegate valve seat 34 is formed as a thick wall portion 35 having a locally increased thickness. The thick wall portion 35 has a greater wall thickness than the remaining part of the curved wall portion 32 and the valve peripheral wall portion 33 (excluding boss portions which are locally increased in thickness to form holes for fasteners). The valve peripheral wall portion 33 is provided with a smaller wall thickness than that of the remaining part of the thick wall portion 35, and may be provided with a smaller wall thickness than the peripheral wall portions of conventional turbine housings.

The positioning of the thick wall portion 35 is highly important in increasing the resistance of the turbine housing 2 to thermal stress. According to the illustrated embodiment, a first hypothetical line L1 and a second hypothetical line L2 are defined such that the first hypothetical line L1 extends in a flow direction of exhaust gas in the exhaust inlet passage 8 at a center of an outlet of the bypass passage 16, and the second hypothetical line L2 orthogonally crosses the first hypothetical line L1 at the center of the outlet of the bypass passage 16, in axial view. The thick wall portion 35 is provided in a part of the curved wall portion 32 on a side of the first hypothetical line L1 opposite to the turbine outlet passage 14 and on a downstream side of the second hypothetical line L2 with respect to the flow direction of the exhaust gas in the exhaust inlet passage 8. Thus, the thick wall portion 35 is provided in the part of the curved wall portion 32 which is particularly cooled from the outside and heated from the inside, and is hence most susceptible to thermal stress. Therefore, the turbine housing 2 can be protected from thermal stress in a favorable manner.

Figure 7:
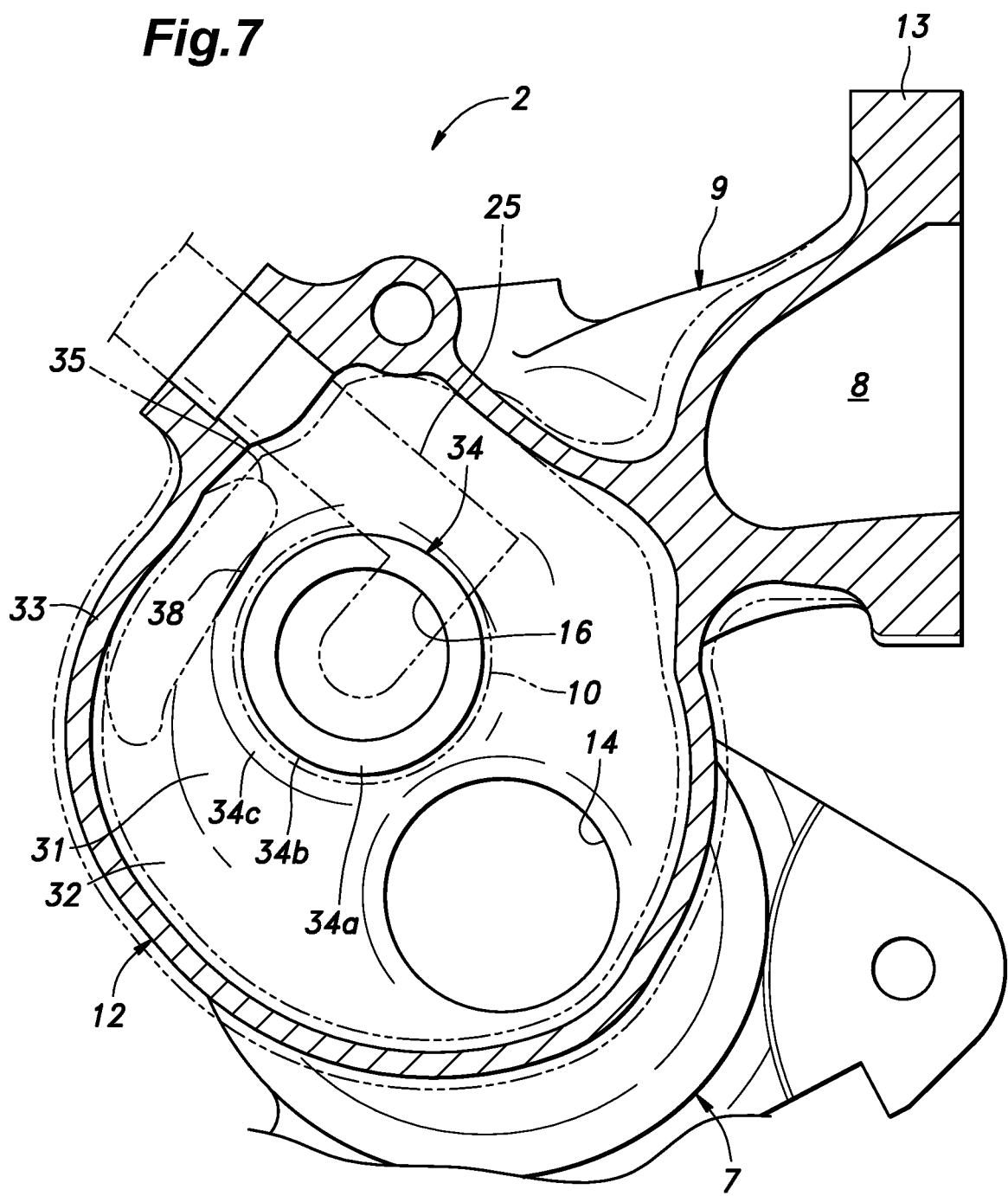
FIG. 7 is a view similar to FIG. 4 showing a conventional structure in imaginary lines.
Figure 8:
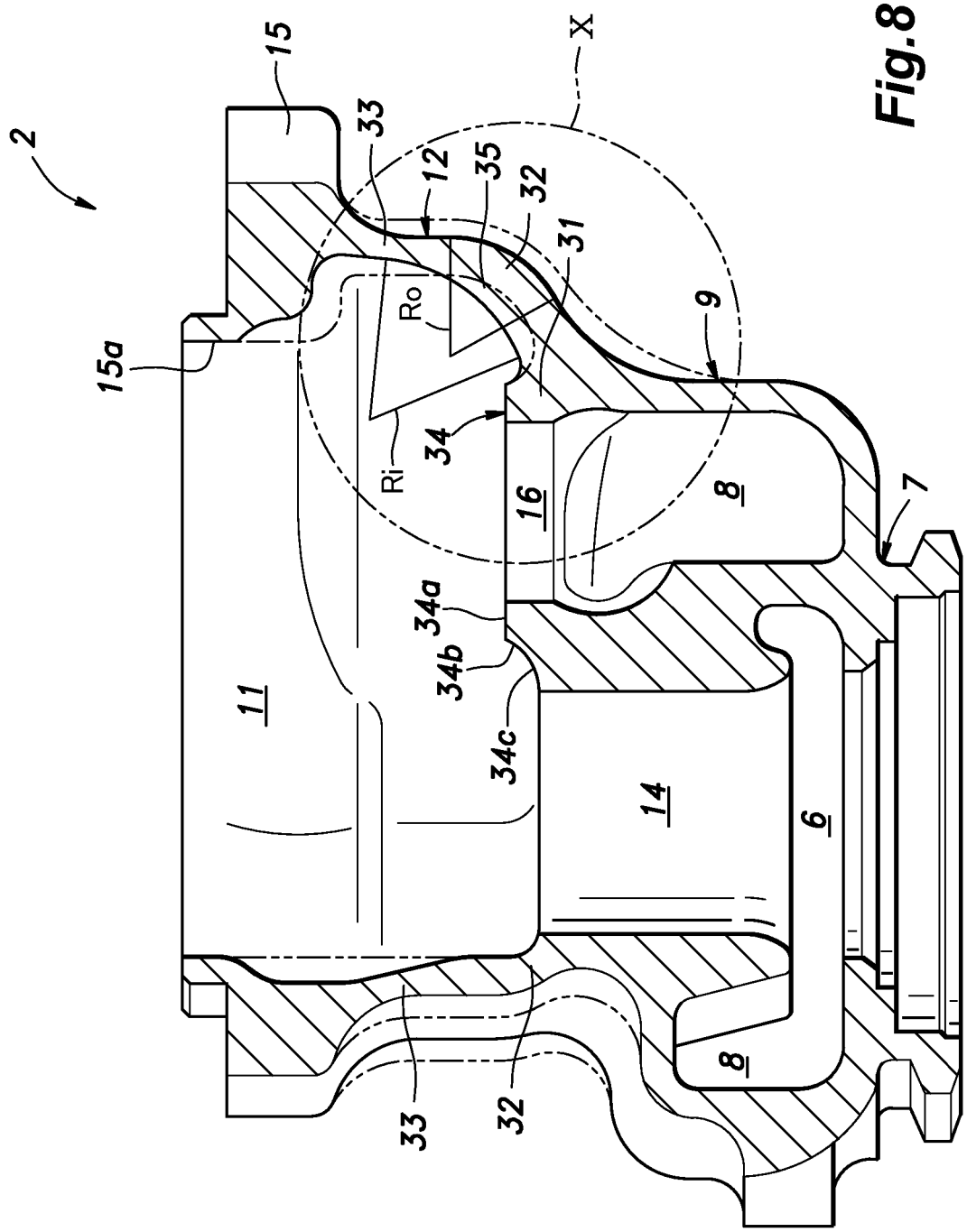
FIG. 8 is a view similar to FIG. 5 showing the conventional structure in imaginary lines.
Figure 9:
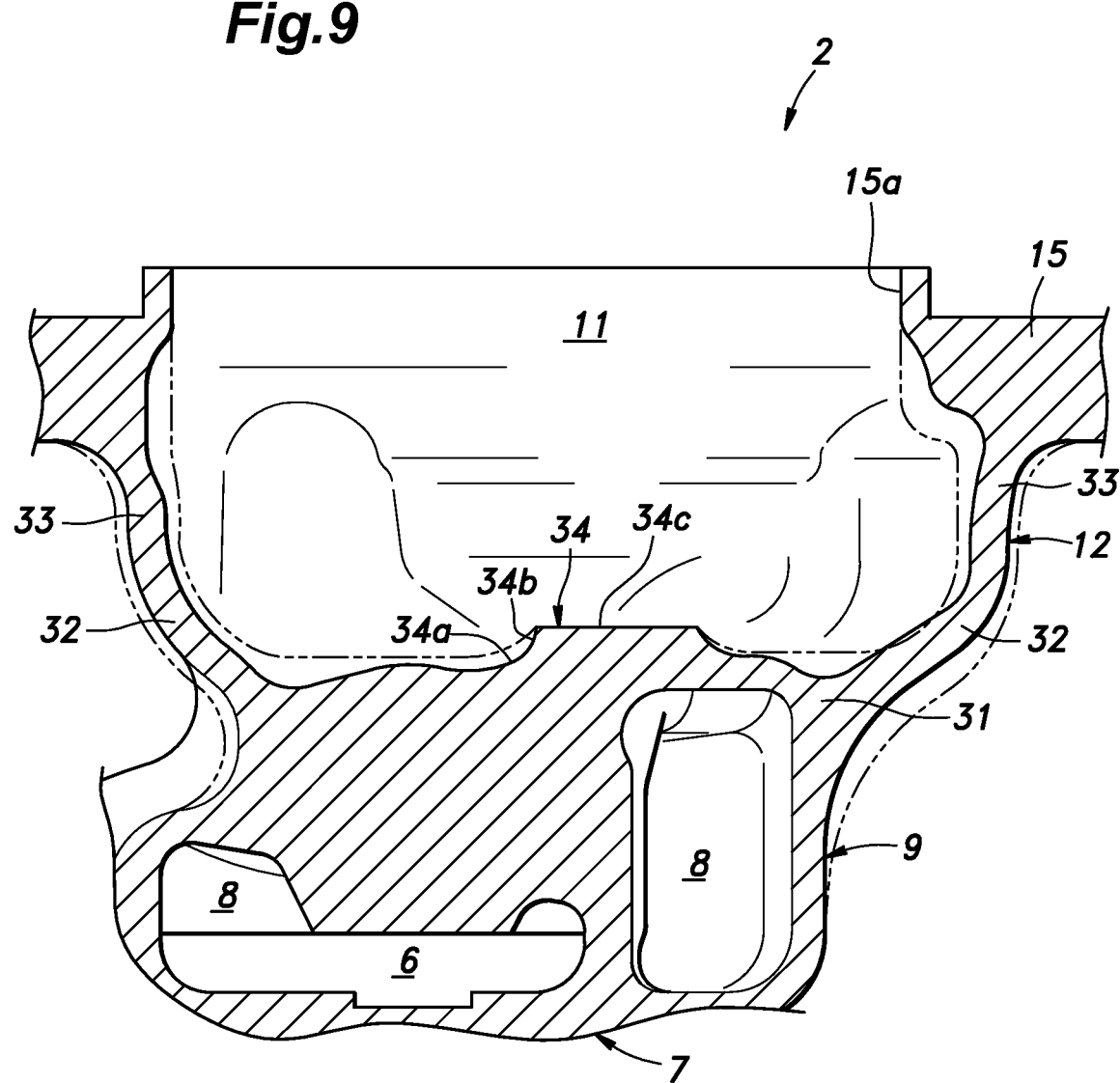
FIG. 9 is a view similar to FIG. 6 showing the conventional structure in imaginary lines.

FIGS. 7 to 9 are cross sectional views of the turbine housing 2 similar to FIGS. 4 to 6, respectively. In FIGS. 7 to 9, the wall of the conventional turbine housing 2 is indicated by imaginary lines. As shown in FIGS. 7 to 9, in the conventional turbine housing 2, the curved wall portion 32 and the valve peripheral wall portion 33 have a substantially constant thickness, and in at least in a part of the valve peripheral wall portion 33 with respect to the circumferential direction, the inner surface of the valve peripheral wall portion 33 extends linearly and is smoothly connected to the inner circumferential surface 15a of the outlet flange 15 in a cross section taken along a plane extending in parallel with the axial direction as shown in FIG. 8.

On the other hand, according to the present embodiment, the inner surface of the valve peripheral wall portion 33 is recessed radially outward substantially over the entire circumference of the valve peripheral wall portion 33. Thus, the axially middle part of the wastegate outlet passage 11 is generally wider than the remaining part of the wastegate outlet passage 11 such as the part thereof defined by the inner circumferential surface 15a of the outlet flange 15. The thick wall portion 35 has a greater wall thickness than the corresponding part of the conventional turbine housing, but the valve peripheral wall portion 33 of the present embodiment has a smaller wall thickness than that of the conventional turbine housing with the exception of the thick wall portion 35. Thus, the outer profile of the part of the turbine housing 2 surrounding the wastegate outlet passage 11 is generally smaller than that of the conventional turbine housing.

As shown in FIG. 4, the thick wall portion 35 is provided on the side of the wastegate valve seat 34 facing away from the turbine outlet passage 14. The thick wall portion 35 opposes the wastegate valve 10 or the wastegate valve seat 34 from a downstream side of the exhaust inlet passage 8. When the wastegate valve 10 is opened, the surface of the wastegate valve 10 facing the wastegate valve seat 34 is at an acute angle relative to the hypothetical plane defined by the wastegate valve seat 34. Therefore, the exhaust gas that exits from the bypass passage 16 is deflected by the opposing surface of the wastegate valve 10 toward a part of the valve peripheral wall portion 33. In the present embodiment, the thick wall portion 35 is positioned in the part of the valve peripheral wall portion 33 where the exhaust gas that exits from the bypass passage 16 impinges upon. Further, the part of the thick wall portion 35 adjoining the end wall 31 smoothly connects with the annular curved surface 34c of the wastegate valve seat 34.

As shown by the cross sectional view of FIG. 5 showing both the turbine outlet passage 14 and the bypass passage 16 in section, the wall thickness of the thick wall portion 35 progressively decreases from the wastegate valve seat 34 to the outlet flange 15. The wall thickness changes smoothly from the part of the end wall 31 adjacent to the wastegate valve seat 34 to the remaining part of the valve peripheral wall portion 33 via the thick wall portion 35. In particular, the wall thickness of the thick wall portion 35 is the greatest in the part thereof adjoining the wastegate valve seat 34, and decreases progressively therefrom toward the outlet flange 15. The thick wall portion 35 is created by inwardly thickening the wall thickness of the curved wall portion 32, instead of bulging the outer surface of the curved wall portion 32 outward. In the sectional view of FIG. 5 (taken along a plane in parallel with the axial direction), the radius of curvature Ri of the inner surface of the thick wall portion 35 is greater than the radius of curvature Ro of the outer surface of the thick wall portion 35.

Figure 10:
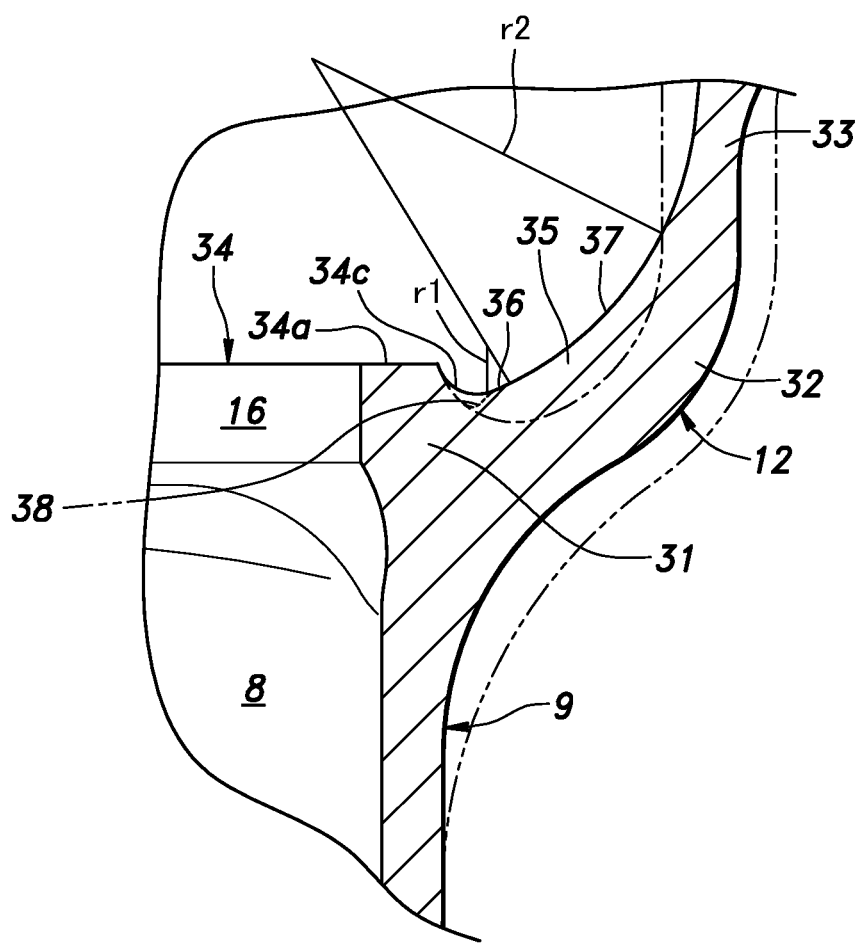
FIG. 10 is an enlarged view of part X indicated in FIG. 8.

FIG. 10 is an enlarged view of a part indicated by X in FIG. 9. The inner surface of the thick wall portion 35 includes an upstream portion 36 having a first radius of curvature r1, and a downstream portion 37 continuous with the upstream portion 36 and having a second radius of curvature r2 which is at least five times greater than the first radius of curvature r1. The downstream portion 37 is at least five times longer than the first radius of curvature r1 (as measured along the inner surface of the valve peripheral wall portion 33 from the upstream end to the downstream end). In other words, the downstream portion 37 accounts for a large part of the inner surface of the thick wall portion 35, including a middle part thereof, and extends more linearly than the upstream portion 36 and smoothly connects with the outer peripheral surface 34b of the wastegate valve seat 34 via the upstream portion 36. The radius of curvature Ri of the inner surface of the thick wall portion 35 corresponds to the second radius of curvature r2 of the downstream portion 37. The downstream portion 37 extends either precisely linearly or substantially linearly, or may define a continuous curve having a varying curvature or given as a combination of a plurality of different curvatures.

The various features and advantages of the present embodiment are discussed in the following.

The thick wall portion 35 which is locally thickened is provided in a part of the curved wall portion 32 adjacent to the wastegate valve seat 34, and the remaining part of the curved wall portion 32 other than the thick wall portion 35 as well as the remaining part of the valve peripheral wall portion 33 is provided with a comparative thin wall thickness. Therefore, the valve housing portion 12 is easily deformable as a whole so that concentration of stress can be avoided. According to the conventional arrangement, the stress concentration is most likely to occur in the part of the curved wall portion 32 adjacent to the wastegate valve seat 34, and cracking is most likely to occur in this region. However, by providing the thick wall portion 35 in this region, stress concentration that could be a cause for cracks can be effectively avoided. Even if an inexpensive material is used for the turbine housing 2, the parts of the curved wall portion 32 and the valve peripheral wall portion 33 other than the thick wall portion 35 can be provided with a relatively thin wall so that overall weight of the turbine housing 2 can be reduced, and occurrence and propagation of cracks in the valve housing portion 12 can be avoided.

As shown in FIGS. 4 and 7, the thick wall portion 35 is provided on the side facing away from the turbine outlet passage 14 with respect to the wastegate valve seat 34, or in the part of the valve peripheral wall portion 33 which is likely to cause a concentration of stress because this part is adjacent to the wastegate valve seat 34. For this reason, the occurrence and propagation of cracks in the valve housing portion 12 can be effectively prevented.

As shown in FIG. 5 and FIG. 8, the part of the valve housing portion 12 that bulges outward with respect to or from the exhaust inlet passage portion 9 is heated by the exhaust gas on the inside, and is cooled by the ambient air on the outside air. Therefore, relatively severe thermal stress is created in this part in a repeated manner. However, in the present embodiment, owing to the presence of the thick wall portion 35, in spite of the repeated thermal stress, occurrence of fatigue cracks can be prevented.

As shown in FIGS. 1 and 4, the exhaust air exiting the bypass passage 16 via the wastegate valve 10 is directed away from the valve shaft 25 so that the part of the valve peripheral wall portion 33 facing away from the valve shaft 25 tends to be subjected to thermal stress more severely than the remaining part of the valve peripheral wall portion 33, and cracks are more likely to occur in this part. In the present embodiment, since the thick wall portion 35 is provided on the part of the curved wall portion 32 or the valve peripheral wall portion 33 to which the exhaust gas exiting the bypass passage 16 is directed, occurrence and propagation of cracks in the valve housing portion 12 can be avoided.

As best shown in FIG. 5, the wall thickness gradually decreases from the part of the end wall 31 surrounding the wastegate valve seat 34 to the downstream end part of the valve peripheral wall portion 33 via the thick wall portion 35, the concentration of stress can be avoided.

Further, as shown in FIG. 10, since the radius of curvature Ri (r2) of the inner surface of the thick wall portion 35 is greater than the radius of curvature Ro of the outer surface of the thick wall portion 35, the thick wall portion 35 can be created without unduly bulging out the outer surface of the curved wall portion 32 so that the size and weight of the turbine housing 2 are not increased due to the presence of the thick wall portion 35.

As described above, the inner surface of the thick wall portion 35 includes the upstream portion 36 provided on side of the end wall 31 and having the first radius of curvature r1, and the downstream portion 37 extending continuously from the downstream end of the upstream portion 36 and having the second radius of curvature r2 which is five or more times greater than the first radius of curvature r1. Further, the downstream portion 37 is five or more times longer than the upstream portion 36 in terms of the length along the flow path of the exhaust gas extending along the inner surface of the valve peripheral wall portion 33. Therefore, stress concentration in the thick wall portion 35 is avoided, and the size and weight of the turbine housing 2 are not increased owing to the absence of a bulging of the outer surface of the turbine housing 2.

Further, since the inner surface of the thick wall portion 35 is connected to the annular curved surface 34c of the wastegate valve seat 34 that connects the inner surface of the end wall 31 and the outer peripheral surface 34b of the wastegate valve seat 34 to each other, stress concentration is avoided. At the same time, owing to the reduction in the outer diameter of the valve housing portion 12, the size and the weight of the turbine housing 2 can be reduced as compared to the conventional arrangement.

As shown by a bold line in FIG. 4 and imaginary lines in FIG. 10, a groove 38 extending in the tangential direction to the axis of the bypass passage 16 may be formed in the connecting portion between the annular curved surface 34c of the wastegate valve seat 34 and the inner surface of the thick wall portion 35. Owing to this arrangement, even when a small crack should be generated either in the annular curved surface 34c of the wastegate valve seat 34 or the inner surface of the thick wall portion 35, the groove 38 prevents the propagation of the crack.

The groove 38 preferably curves along the circumferential direction of the open end of the bypass passage 16 or the wastegate valve seat 34. Thereby, the generation and propagation of the crack in this region can be favorably controlled. Preferably, the groove 38 extends along the boundary between the annular curved surface 34c of the wastegate valve seat 34 and the inner surface of the thick wall portion 35

The present invention has been described in terms of a specific embodiment, but is not limited by such an embodiment, and can be modified in various ways without departing from the spirit of the present invention.

The invention claimed is:

1. A turbine housing of a turbocharger, comprising:
a turbine housing portion defining a turbine chamber receiving a turbine wheel therein, and a turbine outlet passage extending in an axial direction from the turbine chamber;
an exhaust inlet passage portion defining an exhaust inlet passage communicating with the turbine chamber in a tangential direction;
a valve housing portion defining a wastegate outlet passage communicating with the turbine chamber via the turbine outlet passage, and housing a wastegate valve that selectively closes a bypass passage communicating the exhaust inlet passage with the wastegate outlet passage;
a first hypothetical line extending in a flow direction of exhaust gas in the exhaust inlet passage at a center of an outlet of the bypass passage, and
a second hypothetical line orthogonally crossing the first hypothetical line at the center of the outlet of the bypass passage, in axial view,
wherein the turbine housing portion is provided with an end wall separating the wastegate outlet passage from the turbine chamber and the exhaust inlet passage, and provided with openings defining the turbine outlet passage and the bypass passage, a side of the end wall facing the wastegate outlet passage being provided with a wastegate valve seat formed as an annular boss projecting into the wastegate outlet passage and surrounding a downstream end of the bypass passage,
wherein the valve housing portion is provided with a valve peripheral wall portion extending axially from a peripheral part of the end wall so as to define an outer periphery of the wastegate outlet passage, the valve peripheral wall portion including a curved wall portion provided in an upstream part thereof and an outlet flange extending radially outward from a downstream end of the valve peripheral wall portion,
wherein a part of the curved wall portion adjacent to the wastegate valve seat is formed with a thick wall portion having a locally increased thickness,
wherein the thick wall portion is provided in a part of the curved wall portion on a side of the first hypothetical line opposite to the turbine outlet passage and on a downstream side of the second hypothetical line with respect to the flow direction of the exhaust gas in the exhaust inlet passage, and
wherein the thick wall portion has a wall thickness that progressively decreases from the wastegate valve seat to the outlet flange.

2. The turbine housing according to claim 1, wherein the turbine outlet passage and the bypass passage are spaced away from each other in a prescribed direction, and the thick wall portion is positioned in a part of the curved wall portion on a side of the wastegate valve seat facing away from the turbine outlet passage.

3. The turbine housing according to claim 1, wherein the valve housing portion includes a part extended beyond the exhaust inlet passage portion in an axial view, and the thick wall portion is provided in the part of the valve housing portion extended beyond the exhaust inlet passage portion.

4. The turbine housing according to claim 3, wherein an extended part of the curved wall portion overhangs radially outward with respect to an outer profile of the exhaust inlet passage portion.

5. The turbine housing according to claim 1, wherein the wastegate valve is provided with a valve shaft having an axial line substantially in parallel with the second hypothetical line, and located on an upstream side of the wastegate valve seat with respect to the flow direction of the exhaust gas in the exhaust inlet passage.

6. The turbine housing according to claim 1, wherein an inner surface of the thick wall portion is smoothly connected to an annular curved surface which smoothly connects an outer surface of the end wall with an outer circumferential surface of the wastegate valve seat.

7. The turbine housing according to claim 1, wherein a groove extending in a tangential direction with respect to the bypass passage is formed in a part of the end wall located between an annular curved surface of the wastegate valve seat and an inner surface of the thick wall portion.

8. The turbine housing according to claim 7, wherein the groove is curved along a circumferential direction of the wastegate valve seat.

9. The turbine housing according to claim 7, wherein the groove extends between the annular curved surface of the wastegate valve seat and the inner surface of the thick wall portion.

10. A turbine housing of a turbocharger, comprising:
a turbine housing portion defining a turbine chamber receiving a turbine wheel therein, and a turbine outlet passage extending in an axial direction from the turbine chamber;
an exhaust inlet passage portion defining an exhaust inlet passage communicating with the turbine chamber in a tangential direction; and
a valve housing portion defining a wastegate outlet passage communicating with the turbine chamber via the turbine outlet passage, and housing a wastegate valve that selectively closes a bypass passage communicating the exhaust inlet passage with the wastegate outlet passage,
wherein the turbine housing portion is provided with an end wall separating the wastegate outlet passage from the turbine chamber and the exhaust inlet passage, and provided with openings defining the turbine outlet passage and the bypass passage, a side of the end wall facing the wastegate outlet passage being provided with a wastegate valve seat formed as an annular boss projecting into the wastegate outlet passage and surrounding a downstream end of the bypass passage,
wherein the valve housing portion is provided with a valve peripheral wall portion extending axially from a peripheral part of the end wall so as to define an outer periphery of the wastegate outlet passage, the valve peripheral wall portion including a curved wall portion provided in an upstream part thereof and an outlet flange extending radially outward from a downstream end of the valve peripheral wall portion,
wherein a part of the curved wall portion adjacent to the wastegate valve seat is formed with a thick wall portion having a locally increased thickness, and
wherein an inner surface of the thick wall portion has a greater radius of curvature than an outer surface of the thick wall portion in a section passing through the bypass passage and the turbine outlet passage.

11. The turbine housing according to claim 10, wherein the turbine outlet passage and the bypass passage are spaced away from each other in a prescribed direction, and the thick wall portion is positioned in a part of the curved wall portion on a side of the wastegate valve seat facing away from the turbine outlet passage.

12. The turbine housing according to claim 10, wherein the valve housing portion includes a part extended beyond the exhaust inlet passage portion in an axial view, and the thick wall portion is provided in the part of the valve housing portion extended beyond the exhaust inlet passage portion.

13. The turbine housing according to claim 12, wherein an extended part of the curved wall portion overhangs radially outward with respect to an outer profile of the exhaust inlet passage portion.

14. A turbine housing of a turbocharger, comprising:
a turbine housing portion defining a turbine chamber receiving a turbine wheel therein, and a turbine outlet passage extending in an axial direction from the turbine chamber;
an exhaust inlet passage portion defining an exhaust inlet passage communicating with the turbine chamber in a tangential direction; and
a valve housing portion defining a wastegate outlet passage communicating with the turbine chamber via the turbine outlet passage, and housing a wastegate valve that selectively closes a bypass passage communicating the exhaust inlet passage with the wastegate outlet passage,
wherein the turbine housing portion is provided with an end wall separating the wastegate outlet passage from the turbine chamber and the exhaust inlet passage, and provided with openings defining the turbine outlet passage and the bypass passage, a side of the end wall facing the wastegate outlet passage being provided with a wastegate valve seat formed as an annular boss projecting into the wastegate outlet passage and surrounding a downstream end of the bypass passage,
wherein the valve housing portion is provided with a valve peripheral wall portion extending axially from a peripheral part of the end wall so as to define an outer periphery of the wastegate outlet passage, the valve peripheral wall portion including a curved wall portion provided in an upstream part thereof and an outlet flange extending radially outward from a downstream end of the valve peripheral wall portion,
wherein a part of the curved wall portion adjacent to the wastegate valve seat is formed with a thick wall portion having a locally increased thickness, and
wherein an inner surface of the thick wall portion has an upstream portion adjacent to the end wall and having a first radius of curvature, and a downstream portion smoothly connected to a downstream end of the upstream portion, and having a second radius of curvature which is five or more times greater than the first radius of curvature and a length which is five or more times greater than the upstream portion, in a section passing through the bypass passage and the turbine outlet passage.

15. The turbine housing according to claim 14, wherein the turbine outlet passage and the bypass passage are spaced away from each other in a prescribed direction, and the thick wall portion is positioned in a part of the curved wall portion on a side of the wastegate valve seat facing away from the turbine outlet passage.

16. The turbine housing according to claim 14, wherein the valve housing portion includes a part extended beyond the exhaust inlet passage portion in an axial view, and the thick wall portion is provided in the part of the valve housing portion extended beyond the exhaust inlet passage portion.

17. The turbine housing according to claim 16, wherein an extended part of the curved wall portion overhangs radially outward with respect to an outer profile of the exhaust inlet passage portion.

* * * * *